United States Patent
Choi et al.

(10) Patent No.: US 7,753,983 B2
(45) Date of Patent: Jul. 13, 2010

(54) METHOD FOR PREPARING CERAMIC FILTER AND CERAMIC FILTER PREPARED BY THE SAME

(75) Inventors: Jong Sik Choi, Daejeon (KR); Young Min Kong, Daejeon (KR); Hoon Ahn, Daejeon (KR); Sun Joo Kim, Daejeon (KR); Seong Moon Jung, Daejeon (KR); Dae Gon Han, Daejeon (KR)

(73) Assignee: LG Chem, Ltd., Seoul (KR)

( * ) Notice: Subject to any disclaimer, the term of this patent is extended or adjusted under 35 U.S.C. 154(b) by 872 days.

(21) Appl. No.: 11/487,406

(22) Filed: Jul. 17, 2006

(65) Prior Publication Data

US 2007/0017196 A1    Jan. 25, 2007

(30) Foreign Application Priority Data

Jul. 25, 2005   (KR) ...................... 10-2005-0067530

(51) Int. Cl.
   *B01D 39/06*    (2006.01)
   *B01D 24/00*    (2006.01)
   *B01D 39/14*    (2006.01)

(52) U.S. Cl. .............................. 55/523; 55/522; 55/524
(58) Field of Classification Search ............ 55/522–524
   See application file for complete search history.

(56) References Cited

U.S. PATENT DOCUMENTS

| | | | |
|---|---|---|---|
| 3,232,865 A * | 2/1966 | Quinn et al. ................. 210/610 |
| 5,130,109 A * | 7/1992 | Wan .......................... 423/213.2 |
| 6,214,072 B1 | 4/2001 | Kappeler et al. | |
| 6,444,006 B1 | 9/2002 | Haberkamp et al. | |
| 6,582,490 B2 * | 6/2003 | Miller et al. ................... 55/520 |
| 2005/0091952 A1 * | 5/2005 | Ogunwumi et al. ........... 55/523 |
| 2005/0102987 A1 * | 5/2005 | Kudo .......................... 55/523 |

FOREIGN PATENT DOCUMENTS

WO    WO 03/004438    1/2003

* cited by examiner

*Primary Examiner*—Walter D Griffin
*Assistant Examiner*—Amber Orlando
(74) *Attorney, Agent, or Firm*—McKenna Long & Aldridge LLP

(57) ABSTRACT

A ceramic filter and method for preparing the same. The method for preparing the ceramic filter according to the present invention is characterized in comprising the steps of: (a) coating firstly a ceramic green paper prepared by using a slurry solution comprising ceramic fiber of 0.1-10 mm length, with an aluminum silicate solution and drying the firstly coated paper; (b) coating secondly the dried ceramic green paper with an aluminum phosphate solution and drying the secondly coated paper; and (c) calcining the dried ceramic green paper obtained from the step (b). The ceramic filter according to the present invention has excellent mechanical strength since the bonding strength between ceramic fibers is very high, and shows good porosity, gas permeability, and efficiency for capturing microparticles since the pores between the ceramic fibers are less blocked, and thus can be very usefully applied to gas exhaustion system for automobile.

15 Claims, 1 Drawing Sheet

METHOD FOR PREPARING CERAMIC FILTER AND CERAMIC FILTER PREPARED BY THE SAME

This application claims the benefit of Korean Patent Application No. 10-2005-0067530 filed Jul. 25, 2005 in Korea, which is hereby incorporated by reference in its entirety.

TECHNICAL FIELD

The present invention relates to a method for preparing a ceramic filter and a ceramic filter prepared by the same. Specifically, the present invention relates to a method for preparing a ceramic filter having good gas permeability and excellent mechanical strength, and a ceramic filter prepared by the same.

BACKGROUND ART

Diesel automobile has higher energy efficiency, and discharges less carbon monoxide and hydrocarbons, than gasoline one, and thus has been increased more and more since mid-1980s. Recently, however, it became the target of criticism because of its exhaust gas, particularly nitrogen oxides and particulate matters (PM). Accordingly, to solve the air pollution problem by the increase of exhausted PM amount from the increase of diesel automobile, each country applies a strict standard to PM exhaust. Thus, the automobile equipped with a filtering apparatus of exhaust gas has become an important issue in the market entry.

Since the late 1970's, diesel particulate filter (DPF) has been studied as an apparatus for filtering particulate matters in exhaust gas from diesel engine. However, before 1980, the studies were not active because the environmental regulation standard could be met by the development of engine design and the improvement of fuiel, even without equipping DPF. However, the regulation standard became stricter since the late 1980's, whereby the studies about DPF have been more active.

DPF should be able to trap particulates included in exhaust gas, and burn and totally eliminate the particulates before the pressure drop by the trapping affects the engine. Also, DPF should have durability and resistance to heat. Such DPF may be classified into three groups: honeycomb monolith filter, ceramic fiber filter, and metal filter. Among these, the honeycomb monolith filter is vulnerable to heat impact at high temperature, and so has a short life-span. The metal filter has such advantages that its production cost is low and its production is easy, but also has such disadvantages that its heat resistance and corrosion resistance are weak. Recently, therefore, the studies about fiber filters using ceramic fiber have been active. Such ceramic fiber filters are manufactured in the forms of foam, extruded article, and non-woven paper, but the foam and extruded article forms are vulnerable to heat impact, and the extruded honeycomb form has low gas permeability since it cannot have high porosity rate. The non-woven paper form is known to have high porosity rate, and so high efficiency for eliminating particulates.

To commercialize such non-woven filters comprising ceramic fiber, they should have very high mechanical strength enough to stand against the vibration of automobile, high porosity enough to lower the back pressure of exhaust gas, and uniform dispersion of regular-sized pores enough to raise the filtering efficiency of micro-particles.

When manufacturing conventional ceramic filters, the mechanical strength was increased by adding a large amount of inorganic binders to the slurry for preparing green paper. However, this process has disadvantages that the rolling-up and wave-shaping processes are difficult since the tensile strength and plasticity of the green paper are deteriorated, and the filtering performance is decreased since the porosity and mean pore size of the final ceramic filter are decreased.

WO 03/004438 A2 discloses a method for rigidifying a fiber-based paper substrate by impregnating fiber-based paper substrate with an impregnating dispersion containing colloidal nano-clay, followed by calcining, to increase the mechanical strength of ceramic filter, and optionally, further impregnating fiber-based paper substrate with alumina dispersion, zirconyl acetate solution, silica dispersion, etc., as a second impregnating dispersion, followed by calcining. However, this method has such problems that the nano-clay may be agglomerated, and the agglomerated inorganic particles such as clay or alumina may block some pores. Further, even the mechanical strength of the ceramic filter prepared by the above method is not enough to commercialize it.

U.S. Pat. No. 6,214,072 discloses a ceramic filter prepared by coating inorganic binder comprising colloidal silica, colloidal alumina, colloidal zirconia, or mixtures thereof. However, this method also has such disadvantages that the pores may be blocked by the inorganic particles, and the mechanical strength of the final ceramic filter is not satisfactory enough, as WO 03/004438 A2.

Also, U.S. Pat. No. 6,444,006 discloses a method for preventing the decrease of post-calcining strength by conducting heat treatment after uniformly depositing SiC precursors onto the surface of ceramic paper with using the Chemical Vapor Deposition. However, this method has such disadvantages that the process efficiency is very low because the Chemical Vapor Deposition should be used, and thus the production cost is very high.

DISCLOSURE OF THE INVENTION

The first object of the present invention is to provide a method for preparing a ceramic filter having good gas permeability and excellent mechanical strength.

The second object of the present invention is to provide a ceramic filter prepared by the same.

To achieve the above first object, the present invention provides a method for preparing a ceramic filter comprising the steps of: (a) coating firstly a ceramic green paper prepared by using a slurry solution comprising ceramic fiber of 0.1-10 mm length, with an aluminum silicate solution, followed by drying; (b) coating secondly the dried ceramic green paper with an aluminum phosphate solution, followed by drying; and (c) calcining the dried ceramic green paper obtained from the step (b).

Also, to achieve the second object, the present invention provides a ceramic filter having high mechanical strength and high gas permeability, prepared by the above ceramic filter preparation method.

SYMBOLS SHOWN IN THE FIGURES

Figure 1:
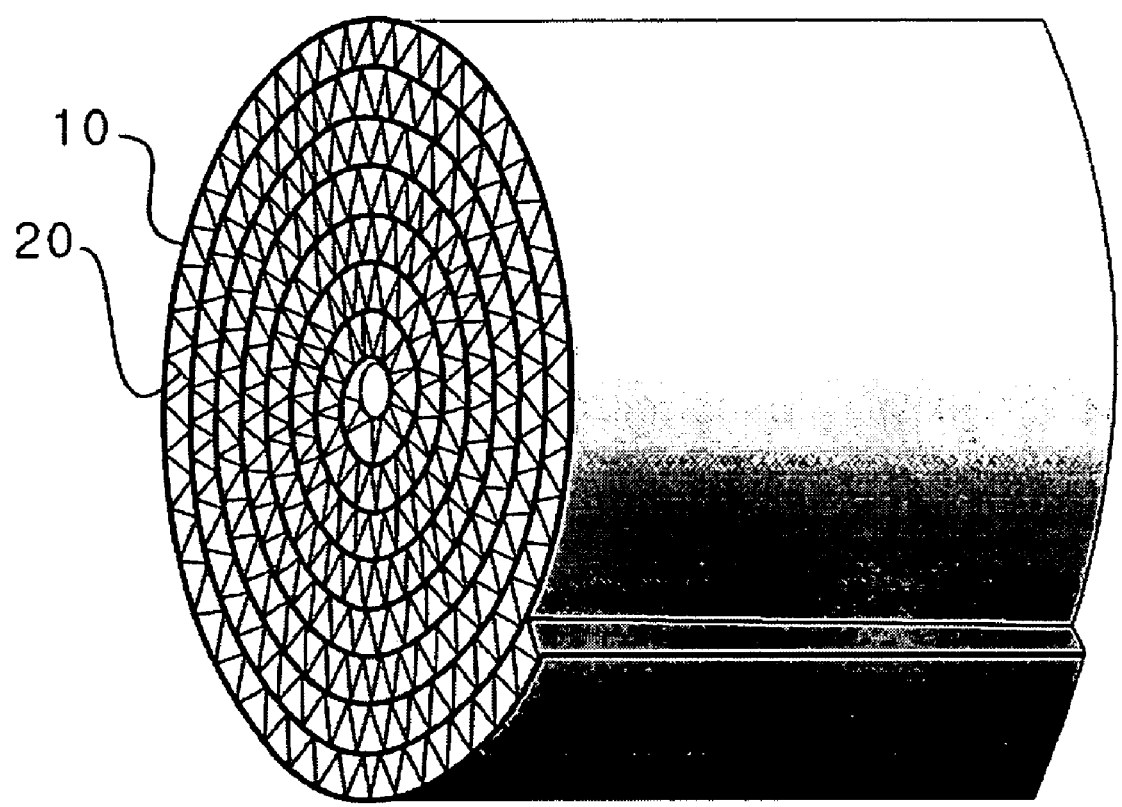
FIG. 1 is a schematic perspective view of the ceramic filter according to the present invention.

10: Plate-shaped ceramic paper
20: Wave-shaped ceramic paper

BEST MODE FOR CARRYING OUT THE INVENTION

The method for preparing the ceramic filter according to the present invention is characterized in that a porous ceramic green paper is firstly coated with an aluminum silicate solution having good adhesion and affinity to the ceramic green paper, to form a primer layer; secondly coated with an aluminum phosphate solution having good adhesion to the layer of aluminum silicate and low viscosity, to form a precursor of inorganic binder; and heat-treated at a high temperature, whereby the precursor reacts to form a strong bond between the ceramic fibers in the ceramic filter, to improve the mechanical strength of the ceramic filter and maintain the porosity of the ceramic filter at a good level.

The ceramic fiber used in the present invention should be made up of a material which can stand a high temperature of 1200° C. or more, and can comprise one or more of alumina or silica such as alumina, alumino silicate, etc. For example, one or more ceramic fibers selected from the group consisting of alumina, alumino silicate, alumino borosilicate, mullite, and mixtures thereof may be used. Also, the ceramic fiber generally has a diameter of 1-20 microns, and the length is 0.1-10 mm, preferably 0.1-1 mm. If the length of the fiber is shorter than 0.1 mm, the mechanical strength of the paper prepared thereby becomes very weak. And, if the length of the fiber is longer than 10 mm, it is hard to uniformly disperse the fiber, and so the paper may not be made uniformly.

The amount of ceramic fiber in the slurry solution may be 50-80% by weight, preferably 70-80% by weight, to the total amount of solid contents in the slurry solution, in order to maintain the shape of the paper and the uniformity of pore even after the calcining step.

The amount of water used in the slurry solution is not critical as long as the whole process can be maintained well. To remove water well during the process, the excess amount of water may be removed through a vacuum pump connected to a paper-making machine, and then remaining excess amount of water may be removed by a press machine.

In the present invention, the ceramic green paper may be manufactured by a conventional paper-making method used in this field, and the slurry solution may comprise organic fiber, preferably one or more selected from the group consisting of natural fiber such as needle-leaf tree pulp, wood fiber, and hemp; synthetic fiber such as nylon, rayon, polyester, polypropylene, polyethylene, aramid, and acryl; and mixtures thereof, in addition to the ceramic fiber as shown above. Also, the slurry solution may further comprise a small amount of organic binder.

The amount of the organic fiber is preferably 5-30 parts by weight to 100 parts by weight of the ceramic fiber. If the amount is less than 5 parts by weight, wave-shaping is difficult since the tensile strength after manufacturing the green paper is not maintained, whereas if more than 30 parts by weight, the strength may be weakened since the porosity is excessively increased after calcining.

The organic binder which may be contained in the slurry solution used in the present invention is not particularly limited if it is conventionally used in the field, and may be one or more selected from the group consisting of methyl cellulose, hydroxyethyl cellulose, sodium carboxymethyl cellulose, purified starch, dextrin, polyvinyl alcohol, polyvinyl butyral, polymethylmethacrylate, polyethylene glycol, paraffin, wax emulsion, microcrystalline wax, and mixtures thereof. The amount of the organic binder may be 5-20 parts by weight to 100 parts by weight of the ceramic fiber. If the amount is less than 5 parts by weight, the fibers are not bonded to each other, whereas if more than 20 parts by weight, the fluidity of the ceramic green paper is excessively increased, and the productivity may be lowered due to stickiness.

The slurry solution used in the present invention may further comprise a pH controlling agent which can lower pH to increase adhesiveness of the organic binder to the ceramic fiber or the organic fiber. Such a pH controlling agent is not particularly limited as long as it is conventionally used in the field. For example, pH of the slurry solution may be maintained between 5.5 and 6.5 by using ammonium aluminum sulfate (alum).

The aluminum silicate solution used in the present invention preferably comprises alcohol, more preferably $C_1$-$C_6$ lower alcohol, aluminum nitrate, tetra-alkyl orthosilicate, more preferably tetra-$C_1$-$C_6$ lower alkyl orthosilicate such as tetraethyl orthosilicate (TEOS), and hydrochloric acid, and has such advantages as good adhesion or affinity to the ceramic green paper since it comprises silicate and aluminum component which are similar to the ceramic fiber component in the ceramic green paper, and good affinity to the aluminum phosphate solution used as the second coating solution. Accordingly, the aluminum silicate solution plays roles to protect the ceramic green paper, and at the same time, increase the adhesion to the aluminum phosphate solution used for the second coating. The aluminum silicate layer formed after heat-treating the aluminum silicate solution functions as buffer layer or primer layer, placed between the ceramic paper inside and the aluminum phosphate solution at utmost exterior, in the final ceramic filter. The amount of each component in the aluminum silicate solution to one mole of TEOS may be as follows: 0.2-0.5 mole of alcohol, 0.01-0.02 mole of aluminum nitrate, and $0.1 \times 10^{-3}$-$0.2 \times 10^{-3}$ mole of hydrochloric acid. If the molar amount of alcohol is less than 0.2, it is not sufficient to dissolve the aluminum nitrate, whereas if more than 0.5, it is difficult to form a proper thickness of coating layer since the overall concentration of aluminum silicate is lowered.

Also, if the molar amount of aluminum nitrate is less than 0.01, it is difficult to form the aluminum silicate, whereas if more than 0.02, it is not dissolved well in alcohol. In case of colloidal alumina generally used, surface charge should be considered when coating it onto a ceramic paper, since the ceramic paper is usually positively charged, and the colloidal alumina is also positively charged, and thus the coating is difficult due to repulsion between the positive charges. However, the present invention uses aluminum nitrate, which is dissolved in alcohol present in ionic state, and the solution is neutral as a whole. Thus, there is no need to consider the charges when coating aluminum nitrate onto the ceramic paper, and it has good adhesion.

Also, if the molar amount of hydrochloric acid used in the present invention is less than $0.1 \times 10^{-3}$, the hydrolysis reaction is not conducted well, whereas if more than $0.2 \times 10^{-3}$, the pores may be blocked since the speed of hydrolysis becomes faster to rapidly form a particle shape of gel, and the dispersivity is lowered.

Colloidal silica conventionally used in the art is gelated by already forming particle shape, and the surface charge should be considered in coating, and the pores could be blocked because of the particle. However, the aluminum silicate solution used in the present invention has such advantages that the adhesion of the coating solution is good, and there is no need to consider charges of particle and surface, since the coating is conducted before the formation and gelation of the particle is occurred, after TEOS is hydrolyzed by controlling the concentration of hydrochloric acid.

If the aluminum phosphate solution below is directly used without using the aluminum silicate solution, the adhesion with the ceramic fiber is lowered, and further, since the aluminum phosphate solution itself is based on an aqueous solution, pulps or the like used as organic fiber are spread out by the aqueous solution when the coating or impregnating is conducted, and thus the green paper may be deformed after drying. However, in the present invention, there is no deformation of pulp as explained above since the aluminum silicate solution used as the first coating solution is an alcohol solution, and the form of green paper can be maintained as it is due to the silicate coating the ceramic fiber in the first coating and drying step, although an aqueous solution is used in the second coating step.

The aluminum silicate solution may increase the bonding strength between fibers by further comprising a small amount of boronic acid, preferably 0.1-10% by weight. The boronic acid can increase the bonding strength of inorganic binder, and improve the thermal stability at a high temperature, by partially substituting aluminum ion.

The aluminum phosphate solution used in the present invention comprises aluminum nitrate and phosphoric acid, and may have P/Al atomic ratio of 3-50. If the atomic ratio is less than 3, the solubility of alumina is very low, and formation of the aluminum phosphate may not be good. And, if the atomic ratio is more than 50, the excess amount of phosphoric acid makes the concentration of alumina low, and thus the coating performance is deteriorated, and the surface of fiber is damaged, whereby the strength may be weakened.

Conventional aluminum phosphate binders are known to be prepared by dissolving hydroxyl aluminum in phosphoric acid. In this case, however, dissociated hydroxyl ion changes the concentration of hydrogen ion in solution to raise the viscosity of the solution, and the pores between the fibers may be blocked if the drying is conducted after impregnating, whereby the gas permeability of the ceramic paper could be lowered. However, the aluminum nitrate used in the present invention does not affect the concentration of hydrogen ion, and thus the viscosity of prepared aluminum phosphate solution is low. Accordingly, aluminum nitrate can be uniformly coated on the ceramic paper, and the blocking of pores can be prevented.

The amount of aluminum phosphate in the aluminum phosphate solution may be 1-80% by weight to the amount of solid contents. If the amount is less than 1% by weight, the coating should be repeated several times to coat a required amount. If the amount is more than 80% by weight, the blocking of pores may happen since the excessive amount of aluminum phosphate remains in the pores.

The aluminum phosphate layer present in the ceramic filter after calcining the ceramic filter according to the present invention is believed to exist two phases of $Al(PO_3)_3$ (aluminum metaphosphate) and $AlPO_4$ (aluminum orthophosphate) in mixture.

Also, the aluminum phosphate solution used in the present invention may further comprise one or more selected from the group consisting of magnesium ion, calcium ion, and boronic acid, which serve a function of enhancing the bonding strength of inorganic binder and thermal stability by partially substituting aluminum ion.

The process for coating the ceramic green paper with aluminum silicate solution and aluminum phosphate solution is not particularly limited, and may be carried out by, for example, impregnation, spraying or the like. The aluminum phosphate solution preferably further comprises a mixed solvent of water and impregnation solvent. For the impregnation solvent, ethanol or isopropyl alcohol may be used, and as the amount of the impregnation solvent, 1-3% by weight to the water is proper. If the amount of the impregnation solvent is less than 1% by weight, the impregnation does not proceed well, whereas if more than 30% by weight, aluminum phosphate may be precipitated.

In the method of preparing the ceramic filter according to the present invention, it is fine to conduct the coating step with the first coating solution and the second coating solution one time, but to increase the strength, the coating step with the first coating solution and the second coating solution, drying, and calcining may be carried out again after the previous coating, drying and calcining.

The method of preparing the ceramic filter according to the present invention may further comprise a step of coating with an aqueous solution of zirconium acetate after the step (a). In this case, zirconia is formed during the calcining, and thus the strength of the ceramic filter can be more enhanced. Also, the aqueous solution of zirconium acetate may be coated together with the first coating solution in the first coating step by mixing it with the first coating solution, but if it is mixed with the second coating solution, it is not desirable since zirconium phosphate may be formed and precipitated.

In the present invention, the first coating solution and the second coating solution should be separately prepared to conduct the coating steps. It is not desirable to mix the two coating solutions because TEOS is rapidly hydrolyzed due to phosphoric acid present in the second coating solution, to become a gel state.

The step of calcining the ceramic filter in rolled-up form is preferably carried out under vacuum, or in inert gas or air, at 400-1100° C. If the calcining temperature is lower than 400° C., organic components are not eliminated completely, whereas if high than 1100° C., the aluminum phosphate is deformed, and thus the strength may be lowered.

Also, the present invention provides a ceramic filter prepared with a slurry composition comprising ceramic fiber of 0.1-10 mm length, and coated with an aluminum silicate layer and an aluminum phosphate layer. The ceramic filter form preferably has a honeycomb structure wherein a porous plate-shaped ceramic paper and a wave-shaped ceramic paper are adhered to each other.

In the ceramic filter according to the present invention, the mean peak weight and gas permeability of the ceramic paper used in the ceramic filter after calcining are preferably 300 g or more, and 12 $cc/sec/cm^2$ or more, respectively.

The ceramic filter according to the present invention is prepared in the honeycomb form by wave-shaping the ceramic green paper prepared as above and then bonding the wave-shaped ceramic paper with a plate-shaped ceramic paper. The coating step with the first coating solution and the second coating solution is preferably carried out after preparing the honeycomb form of ceramic filter. The wave-shaping may be conducted by using a wave-shaping machine conventionally used in this field. For example, it is preferable that the drum of the wave-shaping machine usable for the present invention has the valley and pitch of 2 mm and 3 mm, respectively, and the surface temperature and the paper's feeding rate are controllable.

A plate-shaped ceramic paper conventionally used in this field may be also used for the ceramic filter according to the present invention without particular limitation, and the ceramic green paper manufactured as described above may be used as it is.

A schematic perspective view of the ceramic filter according to the present invention is shown in FIG. 1. According to the embodiment of the present invention, the ceramic filter is prepared by placing the plate-shaped ceramic paper under the wave-shaped ceramic paper prepared as above, applying an adhesive to the contact surface, and then bonding them to each other. In this embodiment, an adhesive conventionally used in this field may be used without particular limitation. The final ceramic filter may be prepared by bonding the plate-shaped ceramic paper and the wave-shaped ceramic paper to each other as above, rolling up the bonded papers in cochlear shape, coating them with the aluminum silicate solution and the aluminum phosphate solution, and drying and calcining them.

The present invention can be more specifically explained by the following examples. However, it should be understood that the present invention is not limited by the examples in any manner.

EXAMPLE 1

1-(1) Preparation of Wave-Shaped Ceramic Paper 3 g of alumina-silica fiber having an average length of 300 μm was added to 2000 ml of water, and dispersed by stirring intensively, and a pulp of needle-leaf tree was added to the mixture in the amount of 25% by weight to the ceramic fiber, and an acryl binder for providing flexibility to ceramic paper was added to the mixture in the amount of 10% by weight to the ceramic fiber, and then 1 ml of 1% aqueous solution of ammonium aluminum sulfate with pH 3 was added thereto to adjust the pH of the total slurry solution to about 5.5. Then, the slurry solution was stirred mildly and continuously to mix solid contents therein uniformly, and a ceramic green paper with 9.5 cm of diameter and 800 μm of thickness was prepared from the slurry by using a paper-making machine. After that, the ceramic green paper prepared above was dried in air at room temperature for 30 minutes, and then further in a vacuum oven at 100° C. to remove remaining water therefrom.

Then, the ceramic green paper prepared above was wave-shaped by using a wave-shaping machine (Model: KIER; Manufacturer: Wha-Sung Instrument. Korea; the lengths of valley and pitch: 2 mm and 3 mm, respectively) at the surface temperature of 150° C. with a feeding rate of 2-10 m/min.

1-(2) Preparation of Plate-Shaped Ceramic Paper

A ceramic green paper was prepared in the same manner as in 1-(1) above, except that the paper was not subjected to the wave-shaping. The obtained paper was used as plate-shaped ceramic paper.

1-(3) Preparation of Roll-Up Type of Ceramic Filter

The plate-shaped ceramic paper was placed under the wave-shaped ceramic paper prepared above, and the papers were bonded to each other by applying an adhesive to the contact surface. Starch powder was used as the adhesive, and silica powder was added thereto to enhance the bonding strength after heat treatment at a high temperature. The ceramic filter in which the plate-shaped ceramic paper and the wave-shaped ceramic paper were bonded to each other was rolled-up in cochlear shape, and then heated to 100° C. for drying to give a roll-up type of ceramic filter.

And, the first coating solution was prepared by dissolving 5 g of aluminum nitrate and 0.5 g of boronic acid in 10 ml of alcohol, and adding thereto 1.6 ml of 0.1 M hydrochloric acid with stirring and then 10 ml of TEOS. To the prepared first coating solution, the roll-up type of ceramic filter as prepared above was impregnated for 5 seconds and dried at 120° C. The second coating solution with an atomic ratio of P/Al of 7.5 was prepared by dissolving 7.5 g of aluminum nitrate and 0.5 g of boronic acid in 10 ml of distilled water, and then adding thereto 10 ml of 85% phosphate solution. To the prepared second coating solution, the firstly coated roll-up type of ceramic filter was impregnated for 5 seconds, dried at 120° C., and then calcined at 800° C. in air to give the desired roll-up type of ceramic filter.

EXAMPLE 2

The roll-up type of ceramic filter was prepared in the same manner as in Example 1, except that the amount of aluminum nitrate is reduced, and the amount of distilled water is increased, with using the same amount of phosphate solution, when preparing the second coating solution. That is, after preparing the second coating solution with an atomic ratio of P/Al of 15 by dissolving 3.75 g of aluminum nitrate and 0.3 g of boronic acid in 20 ml of distilled water and adding 10 ml of 85% phosphate solution thereto, the firstly coated and dried roll-up type of ceramic filter was impregnated with the second coating solution as prepared above for 5 seconds, dried at 120° C., and then calcined at 800° C. in air to give the desired roll-up type of ceramic filter.

EXAMPLE 3

The desired roll-up type of ceramic filter was prepared by conducting the coating step using the first coating solution and the second coating solution one more time to the secondly coated roll-up type of ceramic filter prepared in Example 1.

EXAMPLE 4

The desired roll-up type of ceramic filter was prepared in the same manner as in Example 1, except that the firstly coated roll-up type of ceramic filter was impregnated for 5 seconds with a solution diluted by adding 10 ml of zirconium solution to 10 ml of distilled water, and dried it at 120° C., before the second coating after the first coating and drying.

COMPARATIVE EXAMPLE 1

A dispersion solution was prepared by dispersing 20.0 g of Bentorite® SSP nano-clay into 380.0 g of deionized water in beaker with using magnetic stirrer, and stirring the mixture continuously until it became homogeneous, and then adding thereto 13.0 g of isopropyl alcohol to 87.0 g of the dispersed mixture with magnetic stirring. The same ceramic paper as the ceramic green paper before the coating used in Example 1 was impregnated and coated with the above dispersion solution and dried at room temperature, and then calcined at 1000° C. to give a porous ceramic paper.

Experiment 1

Measurement of Strength

Four porous plate-shaped ceramic papers were prepared by coating the ceramic green papers before wave-shaping prepared in Examples 1 to 4 with using the same coating solutions and procedure as in Examples 1 to 4, and calcining them at 800° C. For the prepared porous plate-shaped ceramic papers and the porous ceramic paper prepared in Comparative Example 1, the strength was measured by using a texture analyzer (Texture analyzer XT plus, Stable micro system Inc.) as follows:

After placing a 4 cm×4 cm square sample of porous ceramic paper between two metal layers, each of which had a hole of 2.5 cm diameter, an apparatus having plate was fixed, and the sample was put to contact with a rod having the planar end of 2.85 mm diameter, at the center of the hole. The sample was tested at the crosshead speed of 1 mm/min. The force required to perforate through the paper with the rod was recorded by using 5 Kgf weight cell. Checking the weight-to-deformation curve by using a digital data collection system, the highest peak in the weight-to-deformation curve was taken as the peak weight, as shown in Table 1 below.

Experiment 2

Measurement of Gas Permeability

After preparing the same porous ceramic paper samples as in Experiment 1 above, the gas permeability was measured by using a capillary flow porometer (Porous Materials Inc.). The size of the sample used in this permeability measurement was 30 mm×30 mm, and the test chamber was 45.7 cm of tube with 7.0 cm of inner diameter. To avoid damage to the sample during the test, the porous ceramic paper sample was mounted to the end of inlet of the tube by using a round, rubber-faced sample holder, and a plate having 4.0 mm of test hole was mounted to the other end of the tube. By using a vacuum air blower (Model: HP33P, Clement National Company in Chicago, Ill., USA) equipped with a variable electric transformer operated by 120 V power for adjusting the blowing rate, air was aspirated through the tube by passing through the porous ceramic paper, the test chamber, and the 4 mm hole, and upon the aspirating, the pressures of the test chamber and vacuum side of the test chamber were measured by using a pressure gauge. The vacuum blowing rate was adjusted until the pressure of the test chamber came to 1.28 cm.$H_2O$, and while maintaining the pressure of the test chamber to 1.28 cm.$H_2O$, the pressures of the test chamber and the vacuum side of 4 mm of test hole were measured to determine the gas permeability. The gas permeability was determined in unit of cubic feet per minute per square feet, and calculated into unit of cubic centimeters per second per square centimeter ($cc/sec/cm^2$). The results are shown in Table 1 below.

TABLE 1

| | Mean peak weight (g) | Gas permeability ($cc/sec/cm^2$) |
|---|---|---|
| Example 1 | 400 | 14.9 |
| Example 2 | 340 | 16.9 |
| Example 3 | 780 | 14.1 |
| Example 4 | 559 | 14.5 |
| Comparative Example 1 | 110 | 12 |

As shown in the above Table 1, the strength of porous ceramic paper prepared according to the present invention was superior to that of Comparative Example 1 by 5 times or more, and the gas permeability was increased by 40% or more. From these results, it is ascertained that the ceramic filter according to the present invention can be very effectively used for a filter for eliminating exhaust gas of automobile because it has excellent mechanical strength and high gas permeability.

INDUSTRIAL APPLICABILITY

The ceramic filter according to the present invention has excellent mechanical strength since the bonding strength between ceramic fibers is very high, and shows good porosity, gas permeability, and efficiency for capturing microparticles since the pores between the ceramic fibers are less blocked, and thus can be applied very usefully to gas exhaustion system for automobile.

The invention claimed is:

1. A method for preparing a ceramic filter comprising the steps of:
   (a) coating firstly a ceramic green paper with an aluminum silicate solution, and drying the firstly coated paper;
   (b) coating secondly the dried ceramic green paper with an aluminum phosphate solution, and drying the secondly coated paper; and
   (c) calcining the dried ceramic green paper obtained from the step (b),
   wherein the aluminum silicate solution comprises alcohol, aluminum nitrate, tetra-alkyl orthosilicate and hydrochloric acid, and
   wherein the aluminum phosphate solution comprises aluminum nitrate and phosphoric acid, where the atomic ratio of P/Al is 3 to 50.

2. The method according to claim 1, wherein the ceramic green paper is prepared using a slurry solution comprising ceramic fibers selected from the group consisting of alumina, alumino silicate, alumino borosilicate, mullite, and mixtures thereof.

3. The method according to claim 2, wherein the amount of ceramic fiber in the slurry solution is 50-80% by weight to the total amount of solid contents in the slurry solution.

4. The method according to claim 2, wherein the slurry solution comprises one or more organic fibers selected from the group consisting of natural fiber, synthetic fiber and mixtures thereof.

5. The method according to claim 2, wherein the slurry solution comprises one or more organic binders selected from the group consisting of methyl cellulose, hydroxyethyl cellulose, sodium carboxymethyl cellulose, purified starch, dextrin, polyvinyl alcohol, polyvinyl butyral, polymethylmethacrylate, polyethylene glycol, paraffin, wax emulsion, microcrystalline wax, and mixtures thereof.

6. The method according to claim 2, wherein the slurry solution further comprises a pH controlling agent.

7. The method according to claim 6, wherein the pH controlling agent is ammonium aluminum sulfate.

8. The method according to claim 1, wherein the aluminum silicate solution contains 0.2-0.5 mole of alcohol, 0.01-0.02 mole of aluminum nitrate, and $0.1×10^{-3}$-$0.2×10^{-3}$ mole of hydrochloric acid, to one mole of tetra-alkyl orthosilicate.

9. The method according to claim 1, wherein the aluminum silicate solution further comprises boronic acid.

10. The method according to claim 1, wherein the amount of aluminum phosphate in the aluminum phosphate solution is 1-80% by weight to the amount of solid contents.

11. The method according to claim 1, wherein the aluminum phosphate solution further comprises one or more selected from the group consisting of magnesium ion, calcium ion, and boronic acid.

12. The method according to claim 1, further comprising a coating step with an aqueous solution of zirconium acetate after the step (a).

13. The method according to claim 1, wherein the temperature of the calcining step is 400-1100° C.

14. A ceramic filter comprising ceramic paper coated with an aluminum silicate layer and an aluminum phosphate layer, wherein the aluminum silicate layer is formed from an aluminum silicate solution comprising alcohol, aluminum nitrate, tetra-alkyl orthosilicate and hydrochloric acid, and wherein the aluminum phosphate layer is formed from an aluminum phosphate solution comprising aluminum nitrate and phosphoric acid, where the atomic ratio of P/Al is 3 to 50.

15. The ceramic filter according to claim 14, wherein the mean peak weight, and the gas permeability of the ceramic paper used in the ceramic filter after calcining are 300 g or more, and 12 cc/sec/cm$^2$ or more, respectively.

* * * * *